US008372658B2

(12) United States Patent
Shikida et al.

(10) Patent No.: US 8,372,658 B2
(45) Date of Patent: Feb. 12, 2013

(54) CHEMICAL ANALYTIC APPARATUS AND CHEMICAL ANALYTIC METHOD

(75) Inventors: Mitsuhiro Shikida, Aichi (JP); Kazuo Sato, Aichi (JP); Hiroyuki Honda, Aichi (JP); Kohta Inouchi, Aichi (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 13/367,849

(22) Filed: Feb. 7, 2012

(65) Prior Publication Data

US 2012/0135533 A1 May 31, 2012

Related U.S. Application Data

(62) Division of application No. 10/586,165, filed on Nov. 19, 2007.

(30) Foreign Application Priority Data

Jan. 15, 2004 (JP) .................................... 2004-8415

(51) Int. Cl.
*G01N 27/74* (2006.01)

(52) U.S. Cl. ........ 436/501; 436/514; 436/518; 436/526; 436/150; 436/43; 435/4; 435/288.2; 435/287.2; 435/287.5; 422/68.1; 422/500; 422/501; 422/502; 205/98

(58) Field of Classification Search ................. 422/68.1, 422/500, 501, 502, 503, 504, 505, 506, 507, 422/508, 82.02, 82.05, 82.08, 58; 435/288.2, 435/287.2, 287.5; 205/98; 436/43, 150, 436/514, 518, 526, 501
See application file for complete search history.

(56) References Cited

U.S. PATENT DOCUMENTS

| | | | |
|---|---|---|---|
| 6,432,630 | B1 | 8/2002 | Blankenstein |
| 6,632,655 | B1 | 10/2003 | Mehta et al. |
| 2003/0026705 | A1 | 2/2003 | Ishiguro et al. |
| 2004/0018611 | A1 | 1/2004 | Ward et al. |
| 2004/0055891 | A1 | 3/2004 | Pamula et al. |
| 2004/0134854 | A1 | 7/2004 | Higuchi et al. |

FOREIGN PATENT DOCUMENTS

| | | |
|---|---|---|
| EP | 1 270 066 | 1/2003 |
| EP | 1 371 989 | 12/2003 |
| JP | 8 179831 | 7/1996 |
| JP | 2003 50245 | 2/2003 |
| JP | 2003 169661 | 6/2003 |
| JP | 2004 535916 | 12/2004 |
| JP | 2005 503572 | 2/2005 |
| WO | WO 02 066992 | 8/2002 |
| WO | WO 02 087764 | 11/2002 |
| WO | WO 03 026798 | 4/2003 |

*Primary Examiner* — In Suk Bullock
*Assistant Examiner* — Sharon Pregler
(74) *Attorney, Agent, or Firm* — Frommer Lawrence & Haug LLP; William S. Frommer; Ellen Marcie Emas

(57) ABSTRACT

A chemical analytic apparatus of the present invention is the one which proposes that a miniaturization, a making low-cost and portability are possible and also the operation of each process of separation, concentration and dilution of specimen is possible, and, which includes: an introduction means (S1) that introduces a droplet to which magnetic ultrafine particles are mixed into another liquid that differs from the droplet while maintaining a single droplet; a conveyance means by which the droplet that includes the magnetic particles is conveyed in another liquid of the introduction means by applying magnetic field externally to the magnetic ultrafine particles; and processing means (S2 to S6) by which operations for processing of chemical analysis are performed one by one in the process in which the droplet to which the magnetic ultrafine particles are mixed is conveyed by the conveyance means.

11 Claims, 9 Drawing Sheets

(a)

(b)

(c)

(d)

CHEMICAL ANALYTIC APPARATUS AND CHEMICAL ANALYTIC METHOD

This application is a divisional application of U.S. application Ser. No. 10/586,165 filed Nov. 19, 2007 which claims priority to JP 2004-8415 filed in Japan on Jan. 15, 2004 and PCT/JP2005/000633 filed Jan. 13, 2005.

The present invention is the one that relates to a chemical analytic apparatus and chemical analytic method that perform a chemical analysis by using a very small amount of a droplet.

BACKGROUND ART

From the past, a very small channel (or micro-channel) for separation and a reactor that aim to the chemistry, biochemical analysis and DNA array analysis are developed by using a micromachining technology to which a microfabrication technology for semiconductor was applied and developed (reference to Patent document 1, Non-patent document 1 and Non-patent document 2). Also a very small amount of droplet is operated by an electrical method, and an apparatus that performs a biochemical reactive operation of the very small amount of liquid is being proposed by this means (reference to Patent document 2, Non-patent document 3 and Non-patent document 4).

Patent document 1: Japanese patent application H-13-132861.

Patent document 2: Japanese patent application H-15-526523.

Non-patent document 1: "Integrated Micro-chemical system", Material Integration, Vol. 15, No. 2, 2002.

Non-patent document 2: "Chemical system integrated to micro-chip", Chemical Engineering, November, 2002.

Non-patent document 3: "Droplet Manipulation on a Superhydrophobic Surface for Microchemical Analysis", Digest of Technical Papers of transducers, 01, pp. 1150-1153.

Non-patent document 4: "Towards Digital Microfludic Circuits: Creating, Transporting, Cutting and Merging Liquid Droplets by Electrowtting-based Actuation", Technical Digest of MEMS, 2002, pp. 32-35.

DISCLOSURE OF THE INVENTION

In the related art mentioned above, a micro-channel and reactor are integrated on a silicone or glass chip, and a miniaturization and making low-cost to an analytic apparatus are realized. However, the micro-channel and reactor of these are parts of the analytic apparatus, and because the other elements of fluidic machine etc such as a pump, valve etc are large as a conveyance system of liquid, a miniaturization of total system and a making low-cost are not realized yet (reference to Non-patent document 1 and Non-patent document 2).

Also, it includes problem that it is difficult to analyze various chemical and biochemical materials on that site, because the portability of apparatus is poor.

On the other hand, because an apparatus that performs the chemical and biochemical reactions by the operation of very small droplet operates the droplet by the electrical method, a complicated system is not necessary in comparison with an example of the micro-channel and reactor that are mentioned above. Therefore, the miniaturization of total analytic apparatus and the making low-cost can be realized. However there is a problem in which an concentration of a specimen and a dilution that are a system of the chemical analytic apparatus are difficult (reference to Non-patent document 3 and Non-patent document 4).

Then, the present invention is the one that aims to solve the above-mentioned problems, and which is purposed to provide a chemical analytic apparatus and chemical analytic method in which a miniaturization, a making low-cost and portability are possible and also the operation of each process of separation, concentration and dilution of specimen is possible.

To solve the above-mentioned subject and to achieve the purposes of the present invention, a chemical analytic apparatus of the present invention is the one which performs various kinds of processing for analyzing a very small amount of droplet chemically, and which includes, in the condition in which magnetic ultrafine particles are mixed to a droplet, a conveyance means by which the droplet to which the magnetic ultrafine particles are mixed is conveyed in another liquid, for processing of chemical analysis by applying magnetic field to the magnetic ultrafine particles.

Also, a chemical analytic apparatus of the present invention is the one which performs various kinds of processing for analyzing a very small amount of droplet chemically, and which includes, in the condition in which magnetic ultrafine particles are mixed to a droplet, a conveyance step by which the droplet to which the magnetic ultrafine particles are mixed is conveyed in another liquid, for processing of chemical analysis by applying an electric field to the magnetic ultrafine particles.

In the chemical analytic apparatus of the present invention, a series of chemical or biochemical reaction and detection is performed by conveying the droplet of the magnetic ultrafine particles between each unit of reaction, separation, dilution and detection. The magnetic ultrafine particles that are shut away inside of the droplet are utilized to convey the droplet. The droplet is conveyed by capturing the magnetic ultrafine particles that are scattering inside of the droplet by using an external magnetic field and also by using a magnetic force that acts on the magnetic ultrafine particles. Further, the magnetic ultrafine particles also worked as a conveyance use of specimen, and the specimen of target is adhering to the surfaces of the magnetic ultrafine particles.

A surface tension is utilized to form the droplet. A solvent that includes the magnetic ultrafine particles is dropped into silicone oil that is another liquid, and the droplet is formed. A liquid by which the chemical and biochemical characteristics of the specimen are not changed is utilized for the solvent. Although the magnetic force that acts on the magnetic ultrafine particles is utilized when conveying the droplet, the magnetic ultrafine particles do not adhere to the surface of channel. Therefore, the magnetic ultrafine particles can be operated by the magnetic force easily.

Operations of reaction, separation and dilution of a droplet that includes a specimen are performed by uniting or dividing the droplet. In the case of the reaction, a droplet of reactive reagent is formed in a reaction unit that is a small compartment separated by barrier. At this time, the droplet of reactive reagent is fixed in the unit by gates such as bulkheads etc. the droplet is separated from wall of the unit and is shut away inside of that, by applying materials having better wettability to silicone oil than to droplet to materials for this unit and gates.

A droplet that includes a specimen is conveyed by the magnetic force for the magnetic ultrafine particles, and after passing it through the gate that becomes a bulkhead of the reaction unit, and it is united with the droplet of reactive reagent. Because a volume of the droplet that includes the specimen is smaller than the ones of the droplet of reactive reagent, it is a mechanism in which the droplet that includes the specimen can be passed through the gate which becomes the bulkhead of reaction unit in the unit. Also, because the wettability of both droplets is good, two droplets are united by contacting of two droplets.

The separation and division of a droplet are performed when the droplet is made to pass under the bulkhead that is provided between each unit. A height of barrier is adjusted by considering the volume of droplet. Although the magnetic ultrafine particles and the vicinity are moved by the magnetic attractive force along the movement of the external magnetic field when the droplet that includes magnetic ultrafine particles approaches to under bulkhead, most of other portion of the droplet is trapped (or captured) by the bulkhead because the wettability of droplet to the bulkhead is not good. Consequently, a necking in which a neck shaped portion occurs in between the droplet portion that includes magnetic ultrafine particles and the droplet portion that does not include magnetic ultrafine particles is caused. Further, when the magnetic ultrafine particles are made to move by the movement of the external magnetic field, the necking becomes large and finally the droplet is divided to the droplet that includes the magnetic ultrafine particles and the droplet that does not include the magnetic ultrafine particles. Like this, the droplet that includes the magnetic ultrafine particles and the droplet that does not include the magnetic ultrafine particles are separated by using the wettability of droplet. In addition, a division ratio can be controlled by adjusting a volume of droplet and a height of bulkhead.

The dilution is basically performed by uniting the droplet that includes the magnetic ultrafine particles and a droplet for dilution, by using the same mechanism as the reaction unit. A magnification of dilution can be changed by controlling a volume ratio of droplet. As for the detection, a change of the specimen after the reaction is measured by using an optical method such as the absorption-light and light-emission. In addition, to improve a conveyance efficiency of the magnetic ultrafine particles that utilize for the conveyance of specimen, when the droplet is conveyed the magnetic ultrafine particles are cohered and moved, and the magnetic ultrafine particles are dispersed in the inside of droplet to hasten chemical reaction in the processes of reaction and dilution. As for this dispersion/cohesion method, the physical and chemical reactions by using a magnetic force, heat, light or pH are utilized. Also, in the reaction unit, a temperature control with a good accuracy can be performed by integrating a micro-heater and temperature sensor to a substrate if it is necessary.

As mentioned above, in the chemical analytic apparatus of the present invention, only by conveying the droplet that includes the magnetic ultrafine particles by using the external magnetic field, the reaction, separation, dilution and detection of specimen can be performed, and consequently the conveyance system of liquid such as a pump, valve etc. becomes unnecessary. Also, because the magnetic ultrafine particles that utilize as a driving source of the conveyance of droplet are shut away inside of droplet, there is no cohesion on the surface of channel and the magnetic ultrafine particles can be driven easily. Further, the concentration and cleaning to the specimen that includes the magnetic ultrafine particles can be efficiently performed by controlling the volume ratio of droplet in the processes of separation and dilution.

According to the chemical analytic apparatus and method, the apparatus can be miniaturized and the cost can be reduced and also the portability becomes possible, because the valve, etc. are not needed. Furthermore, a series of chemical or biochemical reaction and detection can be performed, by conveying the droplet which includes the magnetic ultrafine particles between each unit of reaction, separation, dilution and detection.

BEST MODE FOR CARRYING OUT THE INVENTION

Figure 1:
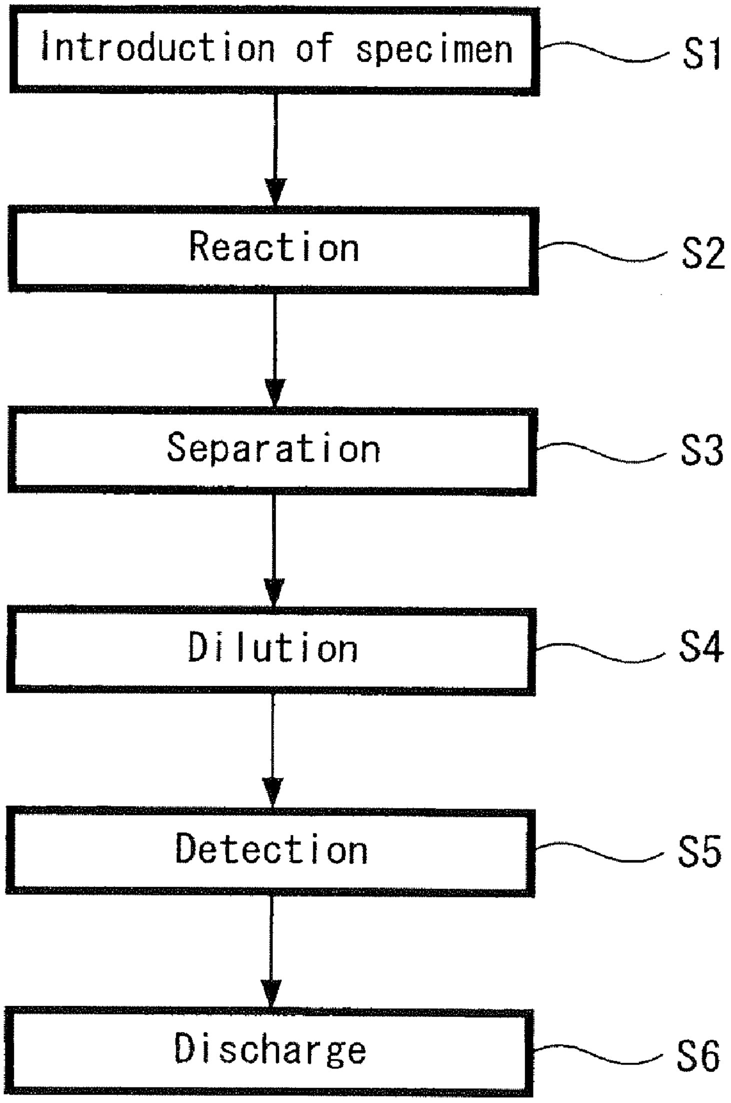
FIG. 1 is a flowchart of processing of specimen in a small sized chemical analytic apparatus.

A flowchart of the processing of a specimen in a small sized chemical analytic apparatus according to the present invention is shown in FIG. 1.

In FIG. 1, a droplet that is a specimen that includes magnetic ultrafine particles is introduced to an introduction unit by capturing and fixing the specimen to the surface of magnetic ultrafine particles such as magnetic beads (step S1). Subsequently, the droplet is conveyed to a reaction unit by the magnetic force, and it is mixed with a reactive reagent and a processing of reaction is performed (step S2). In this case, a temperature control is performed corresponding to the processing of reaction. Next, the droplet after the reaction is conveyed to a separation unit, and here, most of reactive solvent that became unnecessary and a minimum solvent that includes the magnetic ultrafine particles are separated (step S3). The droplet that includes the magnetic ultrafine particles is conveyed to a dilution unit and, in here, it is diluted for the component detection of the droplet (step S4). In addition, there is the case in which this processing is deleted, in accordance with the necessity. Also, a configuration can be made so that the dilution efficiency is improved, by providing a plurality of combination of the separation unit and the dilution unit in series. After having diluted the droplet, it is conveyed to a detection unit and, a result of the reactive processing is measured in here (step S5). After having detected, the droplet is discharged from the apparatus (step S6). As mentioned above, in the small sized chemical analytic apparatus according to the present invention, the series of chemical reaction and detection can be performed, by conveying the droplet that includes the magnetic ultrafine particles to the reaction, separation, dilution and detection unit one by one.

Figure 2:
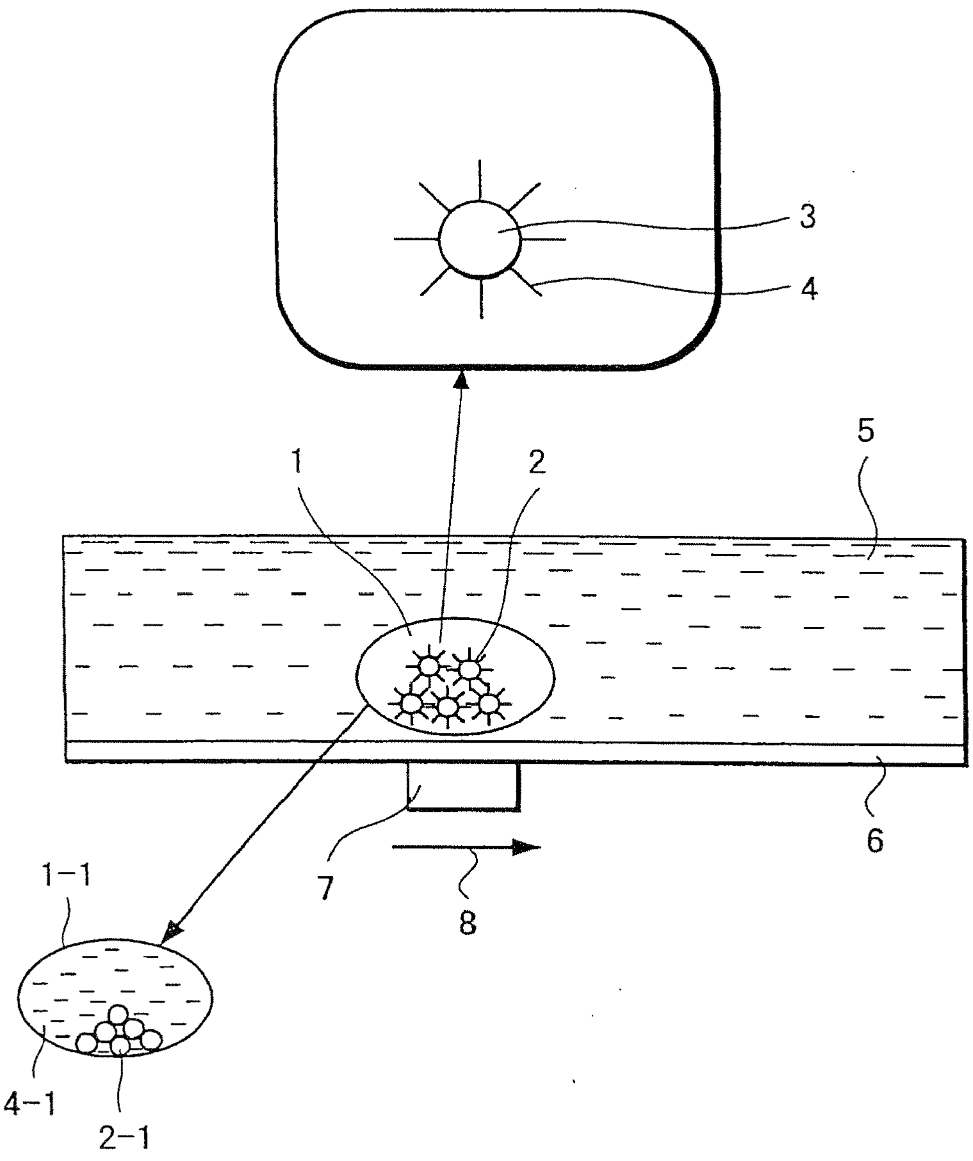
FIG. 2 is a diagram that shows a conveyance mechanism of droplet in a small sized chemical analytic apparatus.

Next, a conveyance mechanism of the droplet in this chemical analytic apparatus is shown in FIG. 2.

In FIG. 2, magnetic ultrafine particles 2 that were shut away inside of the droplet are utilized to convey a droplet 1. The magnetic ultrafine particles 2 that are dispersing inside of the droplet are gathered by using an external magnetic field generating device 7 such as a permanent magnet etc, for example, and also the droplet 1 is conveyed by using the magnetic force that acts on the magnetic ultrafine particles 2. Also, the magnetic ultrafine particles 2 have also a role that conveys the specimen, and the substance indicates the one in the condition in which a specimen 4 adheres to the surface of magnetic ultrafine particles 3 and is fixed on it. A surface tension is used to form the droplet 1. In other words, the droplet 1 is formed, by dropping the specimen 4 that includes magnetic ultrafine particles together with a solvent by a syringe etc. to silicone oil 5 which filled the unit. A liquid that does not change the biochemical characteristic of the specimen 4 is utilized as the solvent. In addition, it is not limited to the droplet 1 that is formed by means in which the specimen 4 adheres to the surface of the above-mentioned magnetic ultrafine particles 2, and the droplet 1-1 may be performed in the condition in which the specimen 4-1 and also gaps between magnetic ultrafine particles 2 are dispersed uniformly, as shown as a droplet 1-1. As for the droplet 1, the magnetic ultrafine particles 2 become a direct carrier of the specimen 4, and against this, as for the droplet 1-1, the magnetic ultrafine particles 2 become an indirect carrier of the specimen 4-1. Although it becomes the same action as the above-mentioned droplet 1, in the case of this droplet 1-1, the degree of freedom of the conveyance of specimen becomes large. In the following explanation, although only the droplet 1 is explained, it will be apparent that it is also able to apply to the droplet 1-1. Also, it may be the condition in which the droplet 1 and the droplet 1-1 are mixed.

As for the conveyance of the droplets 1, the magnetic force that acts on the magnetic ultrafine particles 2 is utilized. When the external magnetic field generating device 7 such as a permanent magnetic, etc. is moved to the move direction (shown in an arrow 8) by a driving device (not shown) through a thin plate 6 which is arranged in the bottom portion of the unit, the magnetic ultrafine particles 2 is attracted according to that, and consequently the droplet 1 that covers the magnetic ultrafine particles 2 is moved. In a droplet conveyance mechanism of the small sized chemical analytic apparatus according to the present invention, because the magnetic ultrafine particles 2 are being shut away inside of the droplet 1, the magnetic ultrafine particles 2 do not adhere to the surface of the thin plate 6 that becomes the channel. Therefore, the magnetic ultrafine particles 2 can be controlled by the magnetic force easily and also the magnetic ultrafine particles 2 which are utilized for the conveyance use of the specimen can be conveyed without dropping out during the conveyance.

In addition, as for the introduction unit mentioned above, the four directional side surfaces and the bottom surface, except for the top side, are covered by the thin plate 6. Also, the conveyance of the droplet can be performed smoothly, by determining the size and numbers of the magnetic ultrafine particles 2 in advance to correspond to the magnetic force of the external magnetic field 7 that acts on the magnetic ultrafine particles 2.

In an embodiment according to the present invention, the one that is based on iron oxide materials is utilized as the magnetic ultrafine particles 2. Also, the size of the magnetic ultrafine particles 2 are from several 10 microns to several 10 nanometers, for example. In addition, it is desirable to determine the size of the magnetic ultrafine particles 2, on the basis of the kinds of the specimen and the specifications of the driving device of the external magnetic field generating device 7. As for the driving device, for example, the one in which the external magnetic field generating device 7 is moved on the rack by a rotation of the motor by using a rack and pinion and motor is utilized. Also, a driving path is suitably formed corresponding to the combination of the linear shapes and/or circular shapes of each unit mentioned above.

Further, the solvent for formation of droplet is also determined by the kinds of specimen. For example, in the case in which a biochemical material is a specimen, a buffer solution is utilized as the solvent. Also, a permanent magnet or a coil that is arranged with the array shape mentioned after is utilized as the external magnetic field generating device 7. In the case in which the permanent magnet is utilized for the external magnetic field generating device 7, though it is necessary to control the strength of magnetic field of the permanent magnet for conveyance of the magnetic ultrafine particles 2 in accordance with the kinds of the specimen, a comparative large magnetic force can be obtained in this case. On the other hand, in the case in which the coil that is arranged in the array shape to the external magnetic field generating device 7 is utilized, though the strength of magnetic field obtained is smaller than the permanent magnet, the external magnetic field can be controlled by an electrical method and a whole of apparatus can be miniaturized.

Concrete operations of reaction, separation and dilution can be performed by uniting and/or dividing the droplet. Embodiments of three operations of droplet of this reaction, separation and dilution are explained one by one, hereinafter.

Figure 3:
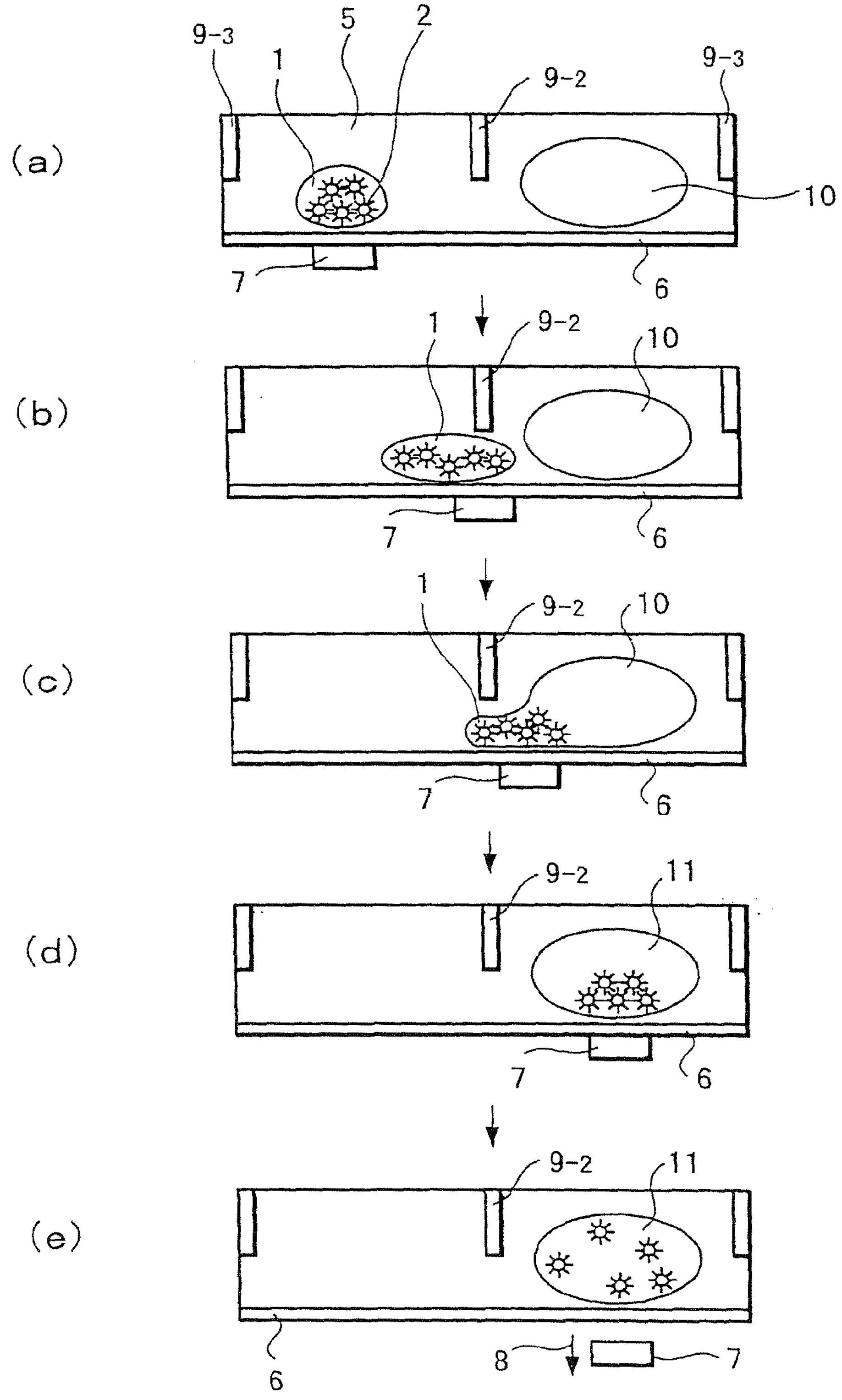
FIG. 3 is a diagram that shows a reaction method in a small sized chemical analytic apparatus, FIG. 3 (*a*) is a process for conveying droplet, FIG. 3 (*b*) is a process for passing through bulkhead, FIG. 3 (*c*) is a process for contacting between droplets, FIG. 3 (*d*) is a process for uniting droplets and FIG. 3 (*e*) is a diagram that shows a process for dispersing magnetic ultrafine particles.

FIG. 3 is the one that shows an embodiment of a reactive method in which the droplet in the small sized chemical analytic apparatus mentioned above is used. FIG. 3 (*a*) is a process for conveying droplet, FIG. 3 (*b*) is a process for passing through bulkhead, FIG. 3 (*c*) is a process for contacting between droplets, FIG. 3 (*d*) is a diagram that shows a process for uniting droplets.

As for the units of the apparatus, four directional side surfaces and a bottom surface, except a top, are covered by the thin plate 6, and also each unit is separated by the bulkheads 9-1, 9-2 and 9-3.

As a basic operation, in the process for conveying droplet shown in FIG. 3 (*a*), the droplet 1 that includes the magnetic ultrafine particles 2 in which a specimen is fixed is conveyed by the magnetic force from the external magnetic field generating device 7, and after passing it through the bulkhead 9-2 to the reaction unit in the process for passing through bulkhead shown in FIG. 3 (*b*), and it is united with a droplet 10 of the reactive reagent and the reactive processing of the specimen is performed, in the process for contacting between droplets shown in FIG. 3 (*c*) and the process for uniting droplets shown in FIG. 3 (*d*).

Because of this, in the process for conveying droplet shown in FIG. 2 (*a*), the droplet 10 of the reactive reagent is formed in advance in the reaction unit that is formed by the bulkheads 9-2 and 9-3. Also, the droplet 1 which includes the magnetic ultrafine particles 2 whose surfaces captured the specimen is introduced in advance to the introduction unit that is formed by the bulkheads 9-1 and 9-2.

In this time, the droplet 10 of the reactive reagent is fixed in a fixed place by the bulkheads 9-2 and 9-3. The material by which the inside surfaces of thin plate 6 and bulkheads 9-2 and 9-3 that form the reaction unit are made is selected to have a better wettability to the silicone oil 5 than the droplet 10 of the reactive reagent, thereby being able to shut the droplet 10 of the reactive reagent away inside of the reaction unit. For example, the lipophilization treatment may be applied to the thin plate 6 and bulkheads 9-2 and 9-3, by depositing parylene resin to a glass plate by means of vapor-deposition. In addition, though only bulkheads 9-1 and 9-2 that narrow the channel in the height direction are shown in here, the bulkheads that narrow the channel in the side (width) direction perpendicular to the height direction may be provided. In the following explanation, though only bulkheads 9-1 and 9-2 that narrow the channel in the height direction are explained, it is the one that also applies to the bulkheads that narrow the channel in the side (width) direction.

In the process for passing through bulkhead shown in FIG. 3 (*b*), the droplet 1 that includes the magnetic ultrafine particles 2 is conveyed by the magnetic force from the external magnetic field generating device 7, and after passing it through the bulkhead 9-2 to the reaction unit, the droplet 1 that includes the magnetic ultrafine particles 2 is contacted with the droplet 10 of the reactive reagent in the process for contacting between droplets shown in FIG. 3 (*c*). Because the volume of droplet 1 that includes the magnetic ultrafine particles 2 is smaller than ones of the droplet 10 of the reactive reagent, it is configured so that it can pass through the bulkhead 9-2 to the reaction unit. Also, because both droplets have the better wettability, two droplets become one by means of the contact.

In the process for uniting droplets shown in FIG. 3 (*d*), after two droplets become one united droplet 11, the magnetic ultrafine particles 2 are dispersed inside of the united droplet 11 in the process for dispersing magnetic ultrafine particles shown in FIG. 3 (*e*). This is done to increase the reaction efficiency of the specimen that is adhering to the surfaces of the magnetic ultrafine particles 2. As this dispersion method, a method that controls to make the magnetic force weak by moving the external magnetic field generating device 7 to the direction to which it is distanced from the united droplet 11 (as shown in an arrow 8) is utilized. Also, other than this method, it can be considered that the phenomenon of cohesion and dispersion of magnetic ultrafine particles 2 that used the physical and chemical reactions by means of a heat, light or pH are utilized. In the FIG. 3 (*e*), the permanent magnet is used as the external magnetic field generation device 7, and the situation where the magnetic ultrafine particles 2 are dispersed inside of the united droplet 11 when the permanent magnet is moved to a direction to which it is distanced is shown.

Figure 4:
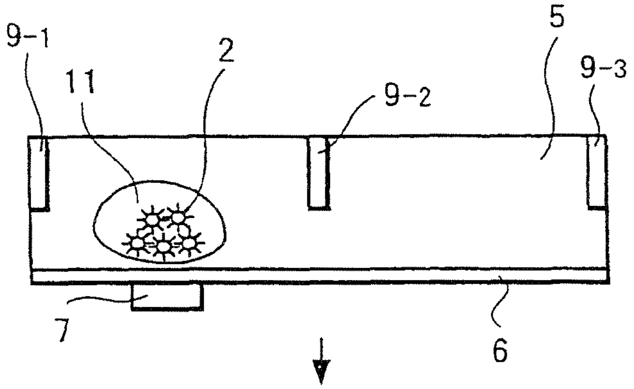
FIG. 4 is a diagram that shows a method of separation/division in a small sized chemical analytic apparatus, FIG. 4 (*a*) is a process for conveying droplet, FIG. 4 (*b*) is a process for passing through bulkhead, FIG. 4 (*c*) is a process for trapping droplet, and FIG. 4 (*d*) is a diagram that shows a process for separating droplet.
Figure 4:
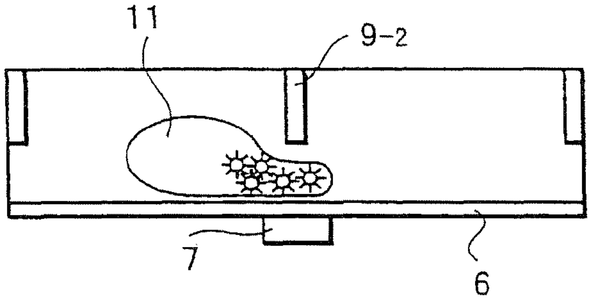
Figure 4:
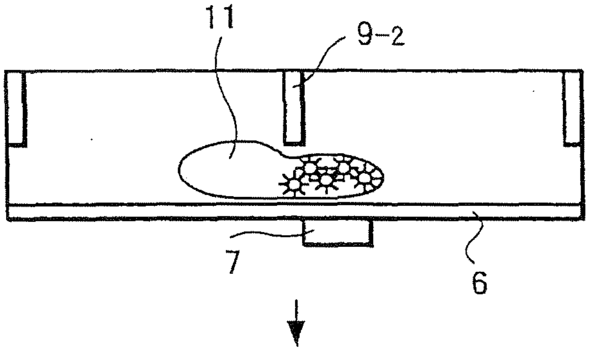
Figure 4:
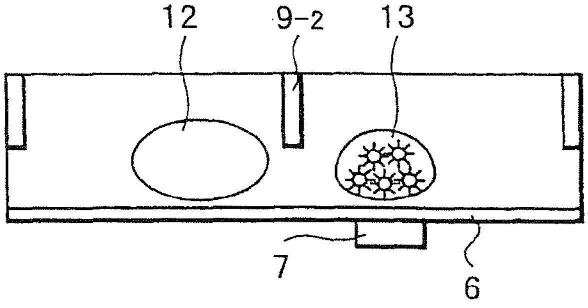

Next, an embodiment of the method of separation/division that used the droplet in the above-mentioned chemical analytic apparatus is shown in FIG. 4.

As for the units of the apparatus, the four directional side surfaces and the bottom surface, except for the top side, are covered by the thin plate 6, and also each unit is separated by the bulkheads 9-1, 9-2 and 9-3. The droplet to be separated in here is the united droplet 11 that was produced in the operation of reaction in FIG. 3 for example.

The method of separation/division shown in FIG. 4 is explained, hereinafter.

FIG. 4 (*a*) is a process for conveying droplet, FIG. 4 (*b*) is a process for passing through bulkhead, FIG. 4 (*c*) is a process for trapping droplet, and FIG. 4 (*d*) is a diagram that shows a process for separating droplet.

As for the separation of the united droplet 11, first, in the process for conveying the droplet shown in FIG. 4 (*a*), the united droplet 11 is conveyed to the front of the bulkhead 9-2 to the separation unit by using the magnetic force from the external magnetic field generating device 7.

After that, in the process for passing through bulkhead shown in FIG. 4 (*b*), the united droplet 11 is conveyed to under the bulkhead 9-2 to the separation unit. Then, because the wettability of the united droplet itself 11 is not good for the bulkhead 9-2, a main portion of the united droplet 11 is trapped (or captured) by the bulkhead 9-2 and only the peripheral portion of the united droplet 11 that includes the magnetic ultrafine particles is moved by depending on the magnetic force of the external magnetic field generating device 7, in the process for trapping droplet shown in FIG. 4 (*c*). Consequently, the necking in which the neck shaped portion occurs in between a portion that does not include the magnetic ultrafine particles and a portion that includes the magnetic ultrafine particles is caused on the united droplet 11.

Further, when the magnetic ultrafine particles are made to move by the movement of the external magnetic field generating device 7, the necking becomes large and finally the united droplet 11 is divided to a droplet 13 that includes the magnetic ultrafine particles and a droplet 12 that does not include the magnetic ultrafine particles, in the process for separating droplet shown in FIG. 4 (*d*). Like this, the united droplet 11 are separated to the droplet 13 that includes the magnetic ultrafine particles and the droplet 12 that does not include the magnetic ultrafine particles by using the wettability of that. In this method of separation/division, the division ratio can be controlled by adjusting the volume of the united droplet 11 and the height of the bulkhead 9-2. Also, the united droplet 11 can be separated to the droplet 13 that includes the magnetic ultrafine particles and the droplet 12 that does not include the magnetic ultrafine particles by only passing through the bulkhead 9-2.

Figure 5:
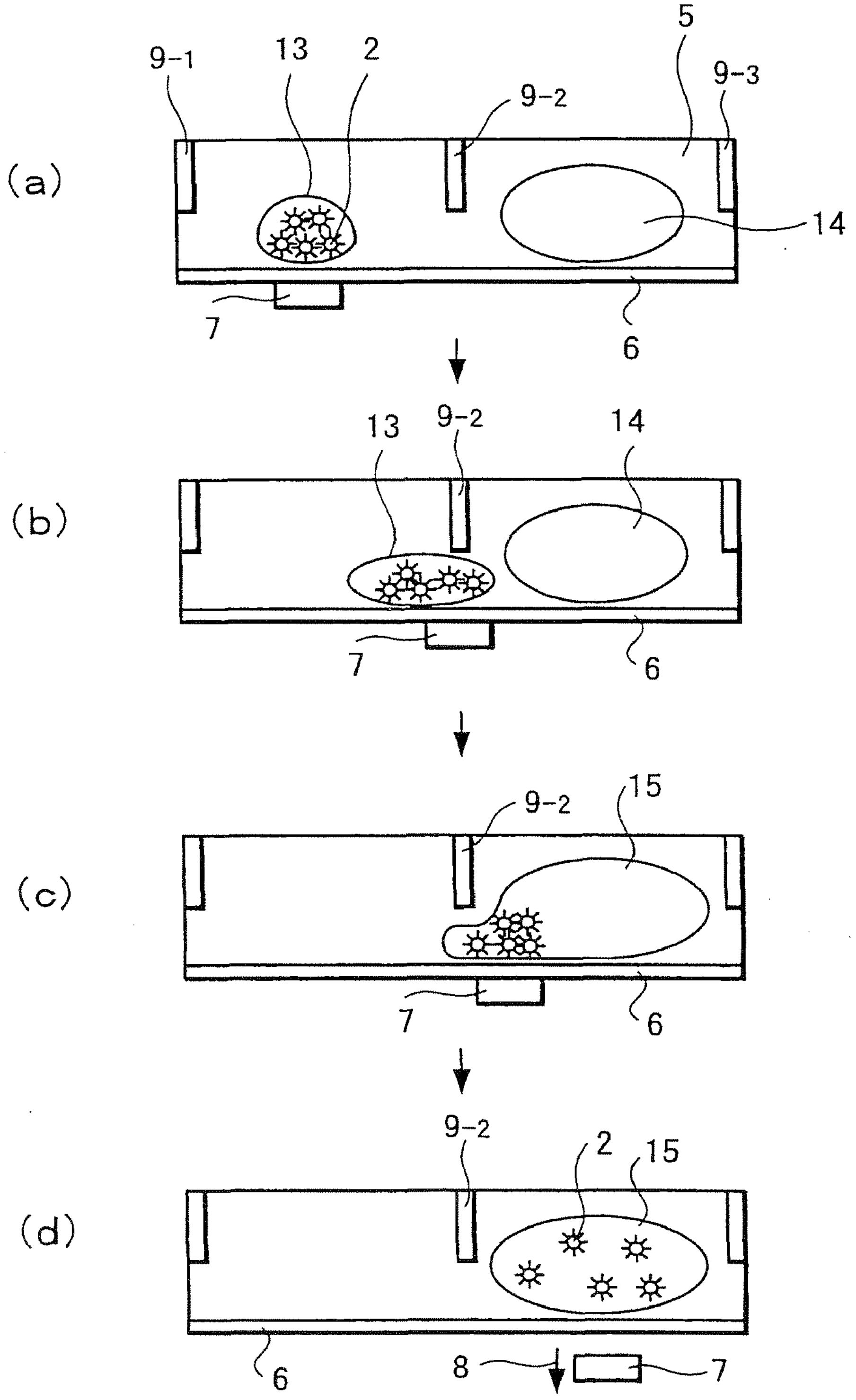
FIG. 5 is a diagram that shows a dilution method in a small sized chemical analytic apparatus, FIG. 5 (*a*) is a process for conveying droplet, FIG. 5 (*b*) is a process for passing through bulkhead, FIG. 5 (*c*) is a process for uniting droplets, and FIG. 5 (*d*) is a diagram that shows a process for dispersing droplet.

Next, an embodiment of the method of dilution that used the droplet in the above-mentioned chemical analytic apparatus is shown in FIG. 5.

FIG. 5 (*a*) is a process for conveying droplet, FIG. 5 (*b*) is a process for passing through bulkhead, FIG. 5 (*c*) is a process for uniting droplets, and FIG. 5 (*d*) is a diagram that shows a process for dispersing droplet.

The operation of dilution is basically performed by the same mechanism as the reaction unit shown in FIG. 3, and in FIG. 5, it is performed by uniting the droplet 13 that includes a water-soluble substance and magnetic ultrafine particles (which become a target of dilution and are obtained by the operation of division in FIG. 4) and a droplet 14 for dilution.

First, in the process for conveying droplet shown in FIG. 5 (*a*), the droplet 13 that includes the magnetic ultrafine particles is conveyed by the magnetic force from the external magnetic field generating device 7. Then, after passing it through the bulkhead 9-2 to the uniting unit, it is united with the droplet 14 for dilution and the dilution processing of the specimen is performed. In this time, in the process for conveying droplet shown in FIG. 5 (*a*), the droplet 14 for dilution is prepared in advance to the dilution unit that is formed by the bulkheads 9-2 and 9-3. Also, the droplet 13 that includes the magnetic ultrafine particles is introduced in advance to the introduction unit that is formed by the bulkheads 9-1 and 9-2.

The droplet 14 for dilution is fixed at a fixed place by the bulkheads 9-2 and 9-3. In here, by selecting the material having better wettability to silicone oil than ones to the droplet 14 for dilution, as the material of the inside surfaces of the thin plate that formed the dilution unit and of the bulkheads 9-2 and 9-3, the droplet 14 for dilution can be shut away inside of the dilution unit. Also, as for this point, the united droplet ii in the reaction unit in FIG. 3, the droplet 13 that includes the magnetic ultrafine particles in the separation unit in FIG. 4 and the droplet 12 that does not include the magnetic ultrafine particles are the same.

In the process for passing through bulkhead shown in FIG. 5 (*b*), the droplet 13 that includes the magnetic ultrafine particles is conveyed by the magnetic force from the external magnetic field generating device 7, and after passing it through the bulkhead 9-2 to the reaction unit, the droplet 13 that includes the magnetic ultrafine particles is united with the droplet 14 for dilution in the process for contacting droplets shown in FIG. 5 (*c*). By means of this, the water-soluble substance included in the droplet 13 that includes the magnetic ultrafine particles is diluted by the droplet 14 for dilution. In here, because the volume of droplet 13 that includes the magnetic ultrafine particles is smaller than ones of the droplet 14 for dilution, it is configured so that it can pass through the bulkhead 9-2 to the reaction unit. Also, because both droplets have the better wettability, two droplets become one by means of the contact.

In the process for uniting droplets shown in FIG. 5(*c*), after making two droplets one united droplet 15, the magnetic ultrafine particles 2 are dispersed inside of the united droplet 15 to increase the dilution efficiency of the water-soluble substance of the target of dilution, in the process for dispersing magnetic ultrafine particles shown in FIG. 5 (*d*). As the method of dispersion, the method that controls to make the magnetic force weak by moving the external magnetic field generating device 7 to the direction to which it is distanced from the united droplet 15 (as shown in an arrow 8) is utilized. Other than this method, the phenomenon of cohesion and dispersion of magnetic ultrafine particles 2 that used the physical and chemical reactions by means of a heat, light or pH can be also utilized. In the FIG. 5 (*d*), the permanent magnet is used as the external magnetic field generation device 7, and the situation where the magnetic ultrafine particles 2 are dispersed inside of the united droplet 15 when the permanent magnet is moved to a direction to which it is distanced is shown.

Here, the dilution ratio can be changed by controlling the volume ratio of the united droplet 15. Also, after diluting the droplet, like this, as for the detection of the result of the processing of reaction, a change of the specimen after the reaction is measured by using an optical method such as the absorption-light and light-emission.

Figure 6:
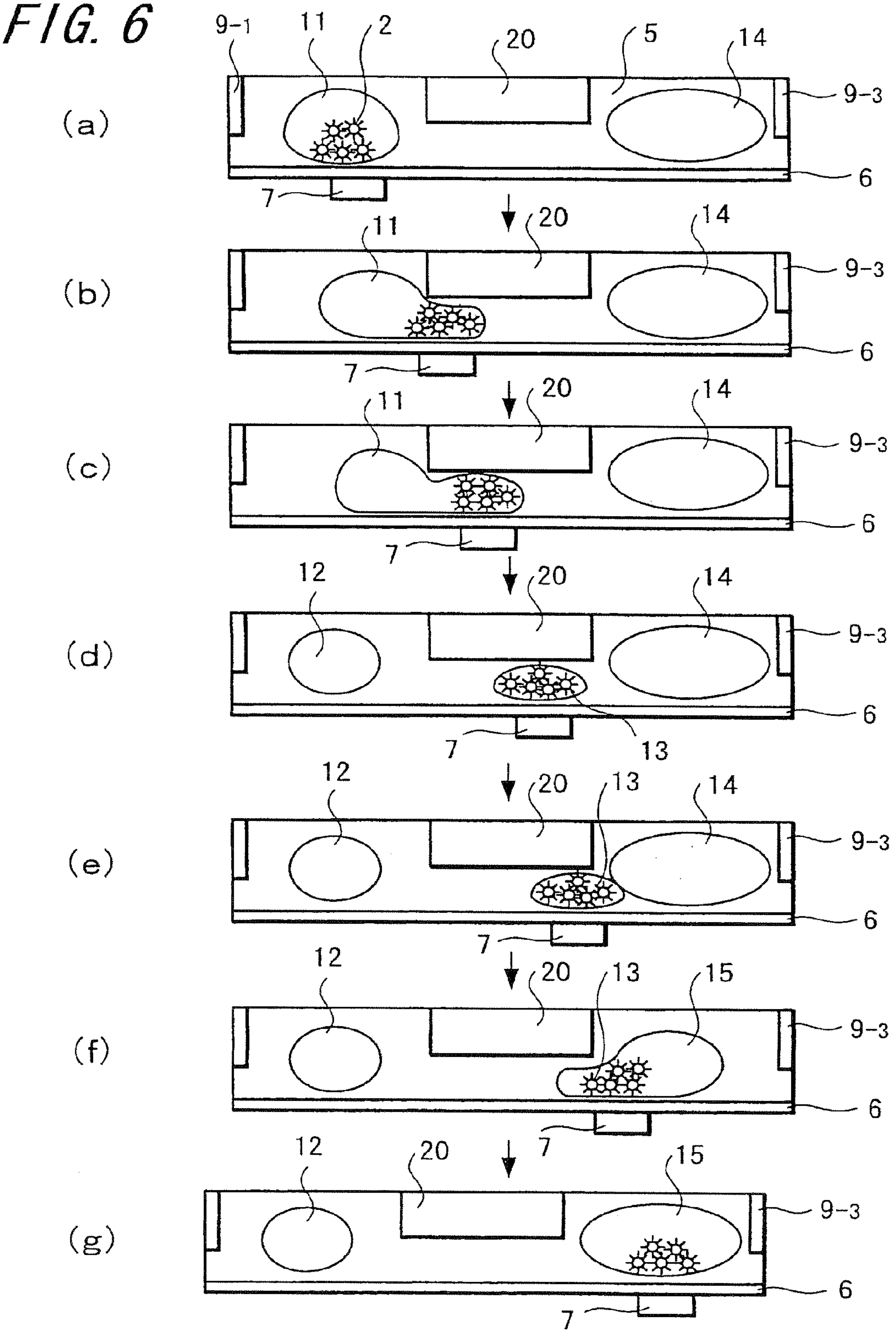
FIG. 6 is a diagram that shows a method of separation/division in a small sized chemical analytic apparatus, FIG. 6 (*a*) is a process for conveying droplet, FIG. 6 (*b*) is a process for passing through bulkhead, FIG. 6 (*c*) is a process for trapping droplet, FIG. 6 (*d*) is a process for separating droplet, FIG. 6 (*e*) is a process for contacting droplets, FIG. 6 (*f*) is a process for uniting droplets and FIG. 6 (*g*) is a diagram that shows a process for cleaning reactive reagent.

In the embodiments of the operation in FIGS. 4 and 5 mentioned above, although the case in which the separation and uniting function of the droplet are performed in each unit is shown, an embodiment in which the separation and uniting function of the droplet are performed by one unit is shown in FIG. 6.

As for the unit of the apparatus, the four directional side surfaces and the bottom surface, except for the top side, are covered by the thin plate 6, and also each unit is separated by the bulkheads 9-1 and 9-3, respectively. The droplet to be separated in here is the united droplet 11 that was produced in the operation of reaction in FIG. 3 for example, and the droplet to be united is the droplet 14 for dilution that was shown in the operation of dilution in FIG. 5.

In the embodiment in which the separation and uniting function of the droplet are performed by one unit and which is shown in FIG. 6, the separation of the droplet is explained, hereinafter. FIG. 6 (*a*) is a process for conveying droplet, FIG. 6 (*b*) is a process for passing through bulkhead, FIG. 6 (*c*) is a process for trapping droplet, FIG. 6 (*d*) is a process for separating droplet, FIG. 6 (*e*) is a process for contacting droplets, FIG. 6 (*f*) is a process for uniting droplets and FIG. 6 (*g*) is a diagram that shows a process for cleaning reactive reagent.

First, in the process for conveying droplet shown in FIG. 6 (*a*), the united droplet 11 is conveyed by the magnetic force from the external magnetic field generating device 7, and then, by passing the united droplet through under the wide bulkhead 20 to the separation/uniting unit in the process for passing through bulkhead shown in FIG. 6 (*b*), the united droplet 11 is trapped (or captured) in the process for trapping droplet shown in FIG. 6 (*c*), and the united droplet 11 is separated to the droplet 12 that does not include the magnetic ultrafine particles and the droplet 13 that includes the magnetic ultrafine particles, in the process for separating droplet shown in FIG. 6 (*d*).

In the process for contacting droplets shown in FIG. 6 (*e*) and process for uniting droplets shown in FIG. 6 (*f*), by contacting and uniting the droplet 13 that includes the magnetic ultrafine particles with the droplet 14 for dilution, the cleaning of the reactive reagent is performed as shown in the process for cleaning reactive reagent in FIG. 6 (*g*).

In the embodiment in which the separation and uniting function of the droplet are performed by one unit and which is shown in FIG. 6, by configuring the wide bulkhead 20 by enlarging the width of bulkhead provided between the introduction and uniting units, the separation between the droplet 13 that includes the magnetic ultrafine particles of the united droplet 11 and the droplet 12 that does not include the magnetic ultrafine particles of the united droplet 11 is performed when passing through under the wide bulkhead 20, and after that, it is configured so that the droplet 13 that includes the magnetic ultrafine particles and the droplet 14 for dilution are united after passing the droplet 13 that includes the magnetic ultrafine particles through under the wide bulkhead 20.

According to the embodiment in which the separation and uniting function of the droplet are performed by one unit and which is shown in FIG. 6, the united droplet 11 after the reaction that was produced in the operation of reaction in FIG. 3 is divided by the wide bulkhead 20, thereby extracting only the droplet 13 that includes the magnetic ultrafine particles of which the specimen adhered to the surfaces, and after that, by uniting it with the droplet 14 for dilution, the process by which the reagent is cleaned can be easily realized.

Also, according to this embodiment, the cleaning efficiency can be changed easily by changing a division ratio of the united droplet 11 and uniting ratio of the united droplet 15. And, the cleaning efficiency of the reactive reagent can further be improved by arranging such configuration in series.

As mentioned above each aforementioned embodiment, the magnetic ultrafine particles are made to be in the condition of cohesion when conveying and dividing the droplet shown in FIGS. 3 to 6, except for the dispersion of the united droplet 11 after the reaction shown in FIG. 3 and also the dispersion of the united droplet 15 after the dilution shown in FIG. 5. The magnetic force that acts on the magnetic ultrafine particles by the external magnetic field according to the external magnetic field generating device 7 depends on the volume of the magnetic ultrafine particles, therefore the bigger the volume the bigger the force. However, because the magnetic ultrafine particles that are actually used are smaller than 10 microns, the magnetic force that acts on it is also small, and because of this, it is difficult to obtain a sufficient magnetic force to convey the droplet.

Then, in an embodiment that is explained below, a big magnetic force is obtained by making the cohesion of the magnetic ultrafine particles when conveying the droplet, and because of this, the droplet is conveyed easily. Also, when the droplet is divided, the magnetic ultrafine particles are made to be in the condition of the cohesion to extract only the magnetic ultrafine particles that work as the conveyance of the specimen.

On the other hand, when the magnetic ultrafine particles are introduced into the droplet for reaction or the droplet for dilution, the dispersion to the droplet of the magnetic ultrafine particles becomes the condition which is not good if the magnetic ultrafine particles are to be in the condition of the cohesion. Therefore, under such condition mentioned above, it is necessary to increase the reaction between the specimen that is on the surfaces of the magnetic ultrafine particles and the droplet, by dispersing the magnetic ultrafine particles to the inside of the droplet.

Figure 7:
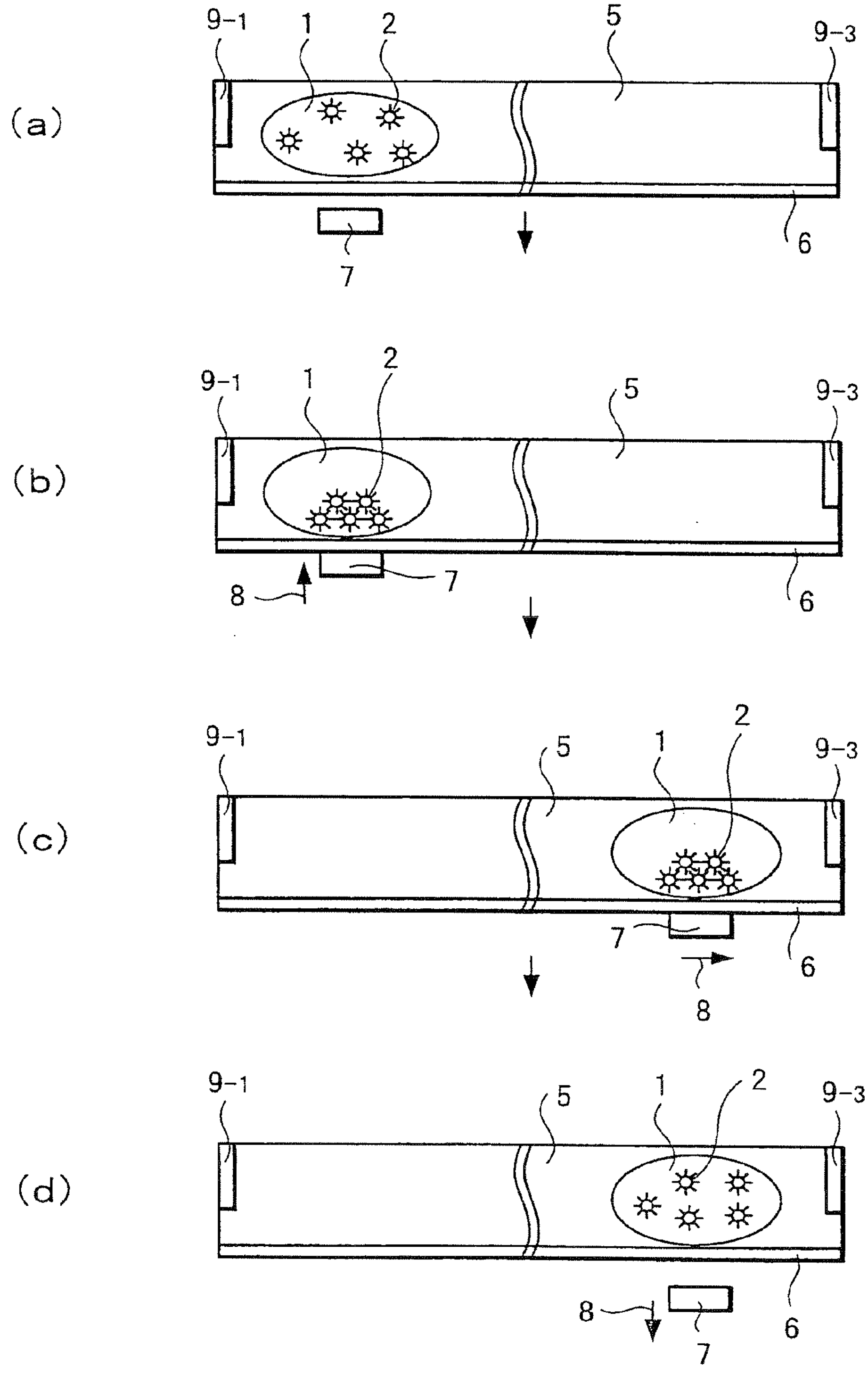
FIG. 7 is a diagram that shows the controls of dispersion/cohesion of the magnetic ultrafine particles in the inside of droplet, FIG. 7 (*a*) is a process for reaction/dilution, FIG. 7 (*b*) is a process for conveyance/division, FIG. 7 (*c*) is a process for conveyance/division, and FIG. 7 (*d*) is a diagram that shows a process for reaction/dilution.

As mentioned above, the magnetic ultrafine particles are required to be controlled to either the condition of dispersion or the condition of cohesion in the droplet, according to situation. FIG. 7 is the one that shows a method that performs the controls of dispersion/dilution of the magnetic ultrafine particles inside of the droplet, as a method by which the above-mentioned mechanism is physically performed. FIG. 7 (*a*) is a process for reaction/dilution, FIG. 7 (*b*) is a process for conveyance/division, FIG. 7 (*c*) is a process for conveyance/division, and FIG. 7 (*d*) is a diagram that shows a process for reaction/dilution.

As for the units of the apparatus, the four directional side surfaces and the bottom surface, except for the top side, are covered by the thin plate 6, and also each unit is separated by the bulkheads 9-1 and 9-3. The droplet to be dispersed or cohered, in here, is the united droplet 11 that was produced in the operation of reaction in FIG. 3 for example, or the united droplet 15 that was produced in the operation of dilution in FIG. 5.

First, in the process for conveyance/dilution shown in FIG. 7 (*a*), the magnetic ultrafine particles 2 are dispersed in the inside of the droplet 1 by moving the permanent magnet to the direction to which it is distanced from the droplet 1 that includes the dispersed magnetic ultrafine particles which were produced in the operations of reaction and dilution. Next, in the process for conveyance/division shown in FIG. 7 (*b*), the magnetic ultrafine particles 2 are cohered in the inside of the droplet 1 by moving the permanent magnet to the direction to which it is distanced from the droplet 1 that includes the dispersed magnetic ultrafine particles, then, the droplet 1 that includes the magnetic ultrafine particles that were cohered is conveyed by the magnetic force from the external magnetic field generating device 7. Subsequently, in the process for conveyance/division shown in FIG. 7 (*c*), after passing it through the bulkhead to the other reaction unit (not shown), it is united with the other droplet, and then, in the process for conveyance/dilution shown in FIG. 7 (*d*), the magnetic ultrafine particles 2 are dispersed in the inside of the droplet 1 by moving the permanent magnet to the direction to which it is distanced, by using the permanent magnet as the external magnetic field generating device 7.

Like this, at the time of the reaction/dilution shown in FIG. 7 (*a*), the strength of magnetic field is made weak by means of distancing the droplet 1 from the external magnetic field, and because of this, the magnetic ultrafine particles 2 are controlled to be dispersed in the inside of the droplet 1. On the other hand, at the time of the conveyance/division shown in FIGS. 7 (*b*) and 7 (*c*), the external magnetic field is arranged close to the droplet 1, and it is controlled so that the magnetic ultrafine particles 2 are cohered in the inside of the droplet 1, and again, the external magnetic field 2 is distanced from the droplet 1 and the magnetic ultrafine particles are dispersed in the inside of the droplet 1.

In addition, although only the embodiment that uses the permanent magnet as the external magnetic field generating device 7 is shown in FIG. 7, it is not limited to this, and it may use coils that are arranged in the array shape that is mentioned later. Further, in this case, the presence or non-presence or the strong or weak of the external magnetic field can be easily controlled by means of controlling the electric current that flows to the coils.

According to the chemical analytic apparatus of the embodiment of the present invention, it is not limited to the embodiment of the controls of dispersion/cohesion of the magnetic ultrafine particles inside of the droplet by means of the external magnetic field shown in FIG. 7 mentioned above, the controls of dispersion/cohesion of the magnetic ultrafine particles can also be performed by using the physical and chemical reaction by means of a heat, light or pH.

Figure 8:
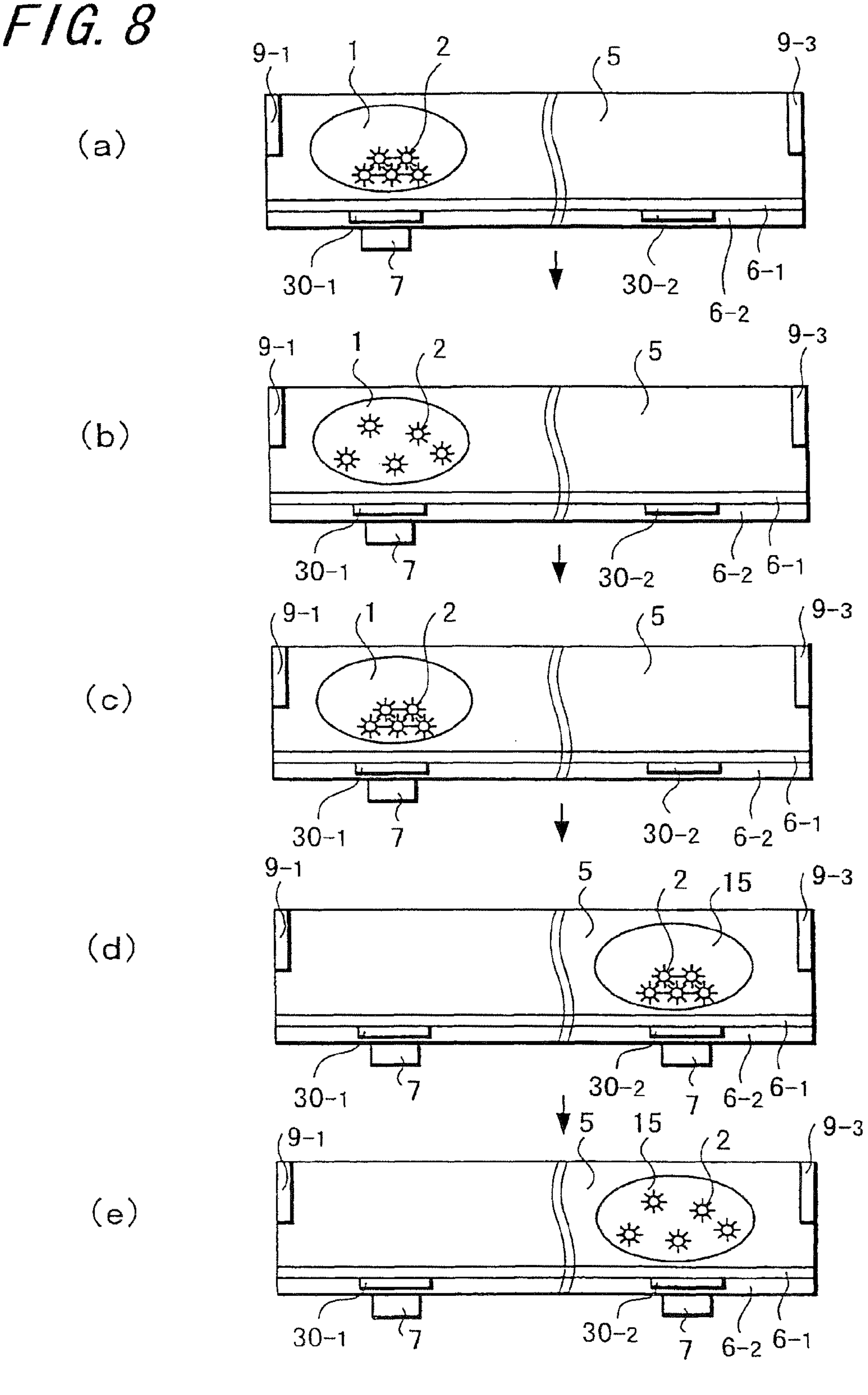
FIG. 8 is a diagram that shows the controls of dispersion and cohesion according to the heat of the magnetic ultrafine particles, FIG. 8 (*a*) is a process for introducing droplet, FIG. 8 (*b*) is a process for turning on the heat to droplet, FIG. 8 (*c*) is a process for turning off the heat to droplet, FIG. 8 (*d*) is a process for turning off the heat to droplet and FIG. 8 (*e*) is a diagram that shows a process for turning on the heat to droplet.

FIG. 8 is the on that shows an embodiment that controls the controls of dispersion/cohesion of the magnetic ultrafine particles by using the heat, as one of embodiments. FIG. 8 (*a*) is a process for introducing droplet, FIG. 8 (*b*) is a process for turning on the heat to droplet, FIG. 8 (*c*) is a process for turning off the heat to droplet, FIG. 8 (*d*) is a process for turning off the heat to droplet and FIG. 8 (*e*) is a diagram that shows a process for turning on the heat to droplet.

In this case, especially, the magnetic ultrafine particles that were chemically ornamented with the temperature-sensitive polymer such as Poly-N-isopropylacrylamide are utilized so that the cohesion is caused by the heat. There are several kinds about the magnetic ultrafine particles of the heat response described above, for example, there are: the one that coheres when the temperature is low or the one that coheres when the temperature is high, etc. Type of these cohesions can be changed by changing the chemical ornament that adheres to the surfaces of the magnetic ultrafine particles. Further, if Polyoxyethylenevinylether that is a pH responsive polymer is utilized, the same effect as the above can be obtained by the change of the pH.

An example in which the magnetic ultrafine particles of the heat response mentioned above are utilized as the conveyance of the specimen is explained with reference to FIG. 8. In addition, this example is the case of the type that coheres when the temperature is low that is mentioned above.

As for the units of the apparatus, the four directional side surfaces and the bottom surface, except for the top side, are covered by the thin plate 6, and also each unit is separated by the bulkheads 9-1 and 9-3. The droplet to be dispersed or cohered, in here, is the united droplet 11 that was produced in the operation of reaction in FIG. 3 for example, or the united droplet 15 that was produced in the operation of dilution in FIG. 5.

First, in the process for introducing droplet shown in FIG. 8 (*a*), the droplet 1 that includes the magnetic ultrafine particles is introduced into the reaction unit in the bulkhead 9-1 side by the movement of the external magnetic field generating device 7. After the introduction, in the process for turning on the heat to droplet shown in FIG. 8 (*b*), the temperature of the droplet 1 is made higher than a fixed level by turning on the power supply and the condition of heating to the heater 30-1 that installed the thin plate 6-2 in the lower portion of the reaction unit. The efficiencies of both of dispersion and reaction can be increased, by setting this temperature to satisfy two that are the dispersive condition of the magnetic ultrafine particles 2 and a reactive promotion temperature.

After finishing the reaction, in the case in which the droplet 1 is conveyed to the other reaction unit of the bulkhead 9-3 side, in the process for turning off the heat to droplet shown in FIG. 8 (*c*), the magnetic ultrafine particles 2 are chemically cohered by turning off the power supply and the condition of heating to the heater 30-1, and are gathered in the vicinity of the external magnetic field generation device 7 under the heater 30-1.

Then, after passing through the division of the droplet and the uniting with the droplet for dilution in the process for turning off the heat to droplet shown in FIG. 8 (*d*), again, in here, the droplet 1 is heated by turning on the power supply and the condition of heating to the heater 30-2 that was installed in the thin plate 6-2 of the lower portion of the other reaction unit of the bulkhead 9-3 side, and the magnetic ultrafine particles 2 are dispersed inside of the droplet for dilution, in the process for turning on the heat to droplet shown in FIG. 8 (*e*).

The condition of cohesion or dispersion of the magnetic ultrafine particles inside of the droplet is caused by using the controls of dispersion/cohesion by means of the heating such as the above, and because of this, the efficiency of the series of biochemical operation such as conveyance, division and cleaning can be increased. The embodiment in FIG. 8 shows the case that used the external magnetic field generating device 7 by means of the permanent magnet for example, as the conveyance system of the magnetic ultrafine particles, and in this case, it is obvious that a driving device that moves the external magnetic field generating device 7 is required.

Also, without limiting to this, it may use the electromagnetic coils of the array shape arranged on the road of the conveyance system as the conveyance system of the magnetic ultrafine particles.

As for the units of the apparatus, the four directional side surfaces and the bottom surface, except for the top side, are covered by the thin plate 6, and also each unit is separated by the bulkheads 9-1 and 9-3. The droplet to be dispersed or cohered, in here, is the united droplet 11 that was produced in the operation of reaction in FIG. 3 for example, or the united droplet 15 that was produced in the operation of dilution in FIG. 5.

Figure 9:
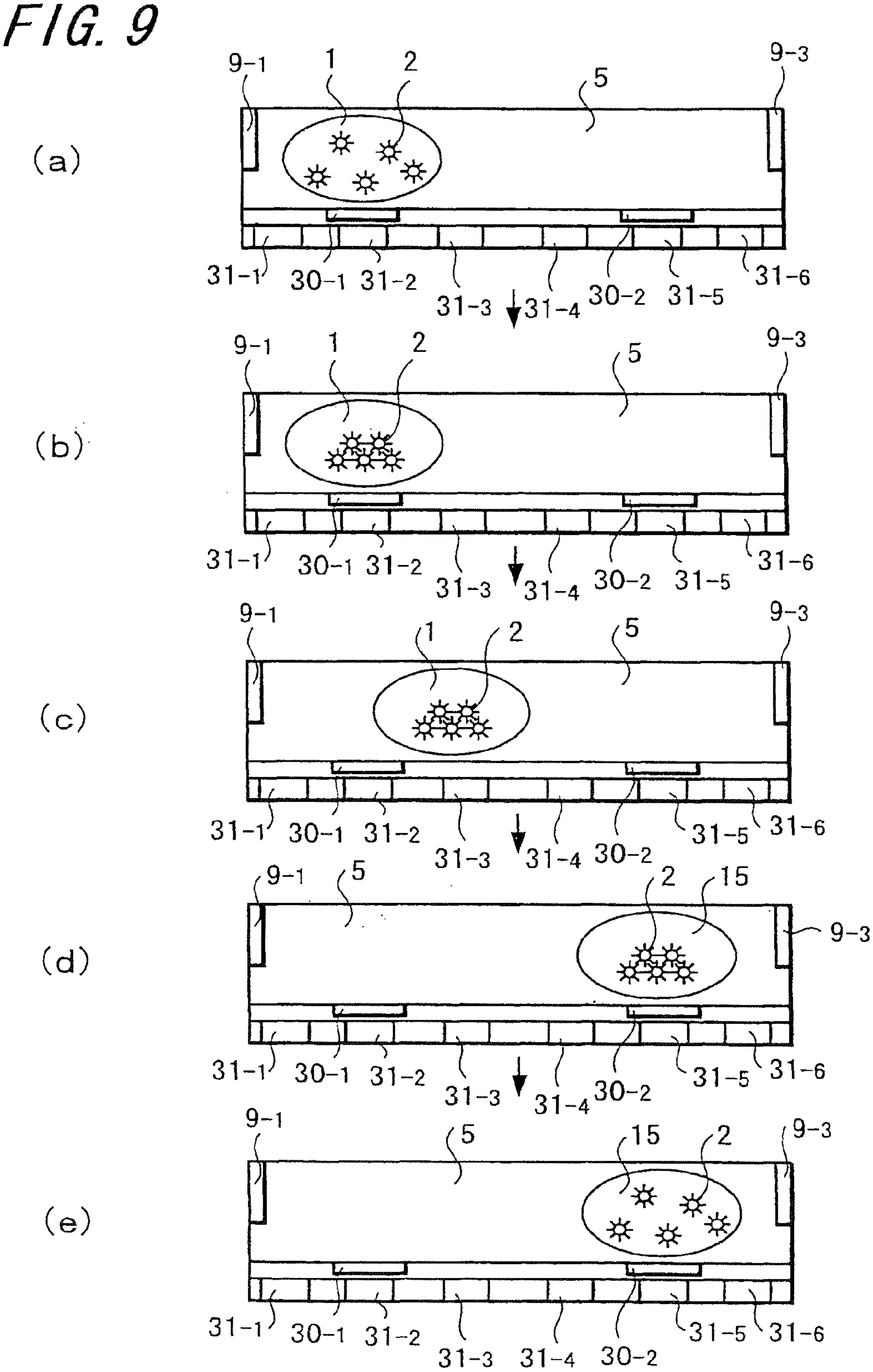
FIG. 9 is a diagram that shows the controls of dispersion and cohesion in the inside of droplet and the conveyance of droplet by an array shaped coil heater, FIG. 9 (*a*) is a process for turning on the heat to droplet, FIG. 9 (*b*) is a process for turning off the heat to droplet, FIG. 9 (*c*) is a process for conveyance, FIG. 9 (*d*) is a process for turning off the heat to united droplets and FIG. 9 (*e*) is a diagram that shows a process for turning on the heat to united droplets.

First, in the process for introducing droplet shown in FIG. 9 (*a*), the temperature of the droplet 1 is made higher than a fixed level by turning on the power supply and the condition of heating to the heater 30-1 that was installed in the lower portion of the reaction unit. The efficiencies of both of dispersion and reaction can be increased, by setting this temperature to satisfy two that are the dispersive condition of the magnetic ultrafine particles 2 and a reactive promotion temperature.

After finishing the reaction, in the case in which the droplet 1 is conveyed to the other reaction unit of the bulkhead 9-3 side, in other words, in the process for turning off the heat to droplet shown in FIG. 9 (*b*), the magnetic ultrafine particles 2 are chemically cohered by turning off the power supply and the condition of heating to the heater 30-1, and are gathered in the vicinity of the external magnetic field generation device 7 under the heater 30-1. Under this condition, in the process for conveying droplet shown in FIG. 9 (*c*), the power supply control is performed in the moving direction one by one to the array shaped coils (31-1 to 31-6) that are arranged on the road of the conveyance system, and because of this, the magnetic force that is obtained is moved to the moving direction, thereby conveying the droplet 1 that includes the cohered magnetic ultrafine particles to the moving direction one by one.

Then, after passing through the division of the droplet and the uniting with the droplet for dilution in the process for turning off the heat to droplet shown in FIG. 9 (*d*), again, in here, the united droplet 15 is heated by turning on the power supply and the condition of heating to the heater 30-2 that was installed in the lower portion of the other reaction unit of the bulkhead 9-3 side, and the magnetic ultrafine particles 2 are dispersed inside of the droplet for dilution, in the process for turning on the heat to droplet shown in FIG. 9 (*e*).

By using the above-mentioned controls of dispersion/cohesion by means of the heating, the condition of cohesion or dispersion of the magnetic ultrafine particles inside of the droplet is produced, and because of this, the efficiencies of the series of biochemical operations such as conveyance, division, cleaning etc. can be increased, and furthermore, by using the array shaped coils (31-1 to 31-6) as the conveyance system of the magnetic ultrafine particles, all the processes: the control of the dispersion/cohesion of the magnetic ultrafine particles inside of the droplet; and the conveyance of the droplet, can be performed by only the electrical control.

The invention claimed is:

1. A chemical analytic method which performs various kinds of processing for chemically analyzing very small droplets, the method comprising the steps of;

- introducing a droplet containing magnetic ultrafine particles into a first small compartment of a plurality of small compartments separated by plural projecting bulkheads;
- conveying the droplet containing the magnetic ultrafine particles, through a stationary fluid by a magnetic force, the droplet passing beneath a first projecting bulkhead and into a second small compartment;
- uniting the droplet containing the magnetic ultrafine particles, with at least another droplet which is stationary within the second small compartment;
- conveying the united droplet to a from of a second projecting bulkhead by the magnetic force;
- conveying via the magnetic force the united droplet beneath the second projecting bulkhead, wherein a main portion of the united droplet is unable to pass the second projecting bulkhead and only a peripheral portion of the united droplet that includes the magnetic ultrafine particles is conveyed by the magnetic force into a third small compartment such that the united droplet is separated and divided into a droplet including the magnetic ultrafine particles and a droplet that does not contain the magnetic ultrafine particles;
- conveying via the magnetic force the divided droplet containing the magnetic ultrafine particles into a fourth small compartment containing at least a further droplet which is stationary within the fourth small compartment;

uniting the divided droplet with the magnetic ultrafine particles with the further droplet;

conveying via the magnetic force the further united droplet with the ultrafine magnetic particles into a small detection compartment to detect the result of the processing; and discharging the further united droplet with the magnetic ultrafine particles from the small detection compartment.

2. The chemical analytic method according to claim 1, wherein by controlling the magnetic force, said magnetic ultrafine particles contained in the droplet are dispersed and cohered in the inside of the droplet, and also a chemical reactive operation of a specimen for performing a chemical reactive operation that adhered to surfaces of said magnetic ultrafine particles is performed.

3. The chemical analytic method according to claim 2, wherein other than the control of said magnetic force, at least physical and chemical reaction control by light, heat or pH is used.

4. The chemical analytic method according to claim 1, wherein in the condition where a specimen for performing a chemical reactive operation is adhered to surfaces of said magnetic ultrafine particles, said magnetic ultrafine particles are used as a carrier to perform the chemical reactive operation to said specimen.

5. The chemical analytic method according to claim 1, wherein by combining the plurality of small compartments, at least a series of chemical reactive operations by reaction, separation and dilution to a specimen that adhered to surfaces of said magnetic ultrafine particles is performed.

6. A chemical analytic method which performs various kinds of processing for chemically analyzing very small droplets, the method comprising steps of:

introducing a droplet containing specimens and magnetic ultrafine particles into a chemical analytic apparatus, the apparatus separated into plural small compartments communicating with each other and entirely filled with a liquid that is stationary in the apparatus, and the droplet containing the specimens and the magnetic ultrafine particles is introduced into the chemical analytic apparatus while maintaining a single droplet in the stationary liquid filling the apparatus, the droplet is immiscible with the liquid; and conveying the droplet containing the specimens and the magnetic ultrafine particles that has been introduced into the apparatus through the stationary liquid in the apparatus, from one compartment to another compartment of the apparatus for performing processing for chemically analyzing the droplet, by moving a magnetic field generation device arranged adjacent to the apparatus in a direction in which the droplet is to be conveyed, the magnetic field generation device generating a magnetic field to which the magnetic ultrafine particles contained in the droplet are attracted.

7. The chemical analysis method according to claim 6, wherein the chemical analytic apparatus entirely filled with the liquid is separated into the plural small compartments communicating with each other by plural bulkheads projecting into the apparatus from a top side thereof.

8. The chemical analysis method according to claim 7, wherein the step of introducing the droplet containing specimens and magnetic ultrafine particles includes introducing the droplet containing the specimens and the magnetic ultrafine particles into a first small compartment of the plural small compartments, and wherein the step of conveying the droplet containing the specimens and the magnetic ultrafine particles from one compartment to another compartment includes conveying the droplet containing the specimens and the magnetic ultrafine particles from the first small compartment to a second small compartment of the plural compartments, the droplet passing beneath a first projecting bulkhead of the plural bulkheads separating the first small compartment from the second small compartment, and uniting the droplet with a droplet of a reactive agent which is fixed in a fixed place within the second small compartment.

9. The chemical analysis method according to claim 8, wherein the step of conveying the droplet containing the specimens and the magnetic ultrafine particles from one compartment to another compartment further includes conveying the united droplet containing the specimens and the magnetic ultrafine particles from the second will compartment to a third small compartment of the plural compartments, the united droplet passing beneath a second projecting bulkhead of the plural bulkheads separating the second small compartment from the third small compartment, and separating and dividing the united droplet into a droplet containing the magnetic ultrafine particles and a droplet not containing the magnetic ultrafine particles, only the droplet containing the magnetic ultrafine particles conveyed to the third small compartment.

10. The chemical analysis method according, to claim 9, wherein the step of conveying the droplet containing the specimens and the magnetic ultrafine particles from one compartment to another compartment further includes conveying the divided droplet containing the magnetic ultrafine particles from the third small compartment into a fourth small compartment oldie plural compartments, the divided droplet passing beneath a third projecting bulkhead of the plural bulkheads separating the third small compartment from the fourth small compartment, and uniting the divided droplet with a droplet for dilution which is fixed in a fixed place within the fourth small compartment.

11. The chemical analysis method according to claim 10, wherein the step of conveying the droplet containing the specimens and the magnetic. ultrafine particles from one compartment to another compartment further includes conveying the further united droplet from the fourth small compartment into a fifth small compartment of the plural small compartments to detect as result of the processing.

* * * * *